(12) United States Patent
Boyd et al.

(10) Patent No.: US 7,651,305 B1
(45) Date of Patent: Jan. 26, 2010

(54) RETRACTABLE FITTING

(75) Inventors: Eric R. Boyd, Ramsey, NJ (US); Mark A. Heinrichs, Brielle, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/456,267

(22) Filed: Jun. 10, 2009

(51) Int. Cl.
  *B61D 45/00* (2006.01)
(52) U.S. Cl. ...................................... 410/111
(58) Field of Classification Search ................. 410/101, 410/102, 106, 107, 111, 112
  See application file for complete search history.

(56) References Cited

U.S. PATENT DOCUMENTS

| | | | |
|---|---|---|---|
| 1,402,496 A * | 1/1922 | Hoffman | 114/218 |
| 2,756,693 A * | 7/1956 | Frost | 410/116 |
| 3,294,354 A | 12/1966 | Batey | |
| 3,904,154 A * | 9/1975 | Jones | 244/110 R |
| 3,917,213 A * | 11/1975 | Poehlmann | 248/509 |
| 4,212,251 A | 7/1980 | DiMartino | |
| 4,347,800 A | 9/1982 | Culver | |
| 4,419,034 A | 12/1983 | DiMartino | |
| 4,507,032 A | 3/1985 | Rosaia | |
| 6,065,917 A * | 5/2000 | Shambeau et al. | 410/107 |
| 6,138,975 A * | 10/2000 | McDaid | 248/499 |
| 6,374,466 B1 * | 4/2002 | Macias | 24/132 R |
| 6,464,437 B1 | 10/2002 | Elwell | |
| 6,523,800 B2 * | 2/2003 | Hsu | 248/499 |
| 6,565,301 B1 | 5/2003 | Lin | |
| 6,637,992 B1 | 10/2003 | Chang | |
| 6,659,034 B1 | 12/2003 | Levey | |
| 6,764,259 B1 | 7/2004 | Preta | |
| 7,214,015 B2 * | 5/2007 | Bruns | 410/102 |
| 7,431,548 B2 * | 10/2008 | Acton et al. | 410/103 |
| 2001/0031187 A1 * | 10/2001 | Goham et al. | 410/106 |
| 2004/0265088 A1 * | 12/2004 | Borrmann et al. | 410/111 |
| 2007/0215015 A1 | 9/2007 | Heinrichs et al. | |
| 2007/0215568 A1 | 9/2007 | Heinrichs et al. | |
| 2007/0217883 A1 | 9/2007 | Heinrichs et al. | |
| 2009/0116926 A1 * | 5/2009 | Armour | 410/101 |

* cited by examiner

*Primary Examiner*—Hilary Gutman
(74) *Attorney, Agent, or Firm*—Frederic J. Zimmerman

(57) ABSTRACT

A retractable fitting assembly may include a cover that is rotatable around a first axis between closed and open positions, and a fitting that is rotatable around a second axis between closed and open positions. The first and second axes may be spaced apart and generally parallel. The direction of rotation of the fitting from the closed position to the open position may be opposite the direction of rotation of the cover from the closed position to the open position. In the closed position of the cover and the open position of the fitting, at least a portion of the cover abuts the fitting to thereby hinder rotation of the fitting.

14 Claims, 5 Drawing Sheets

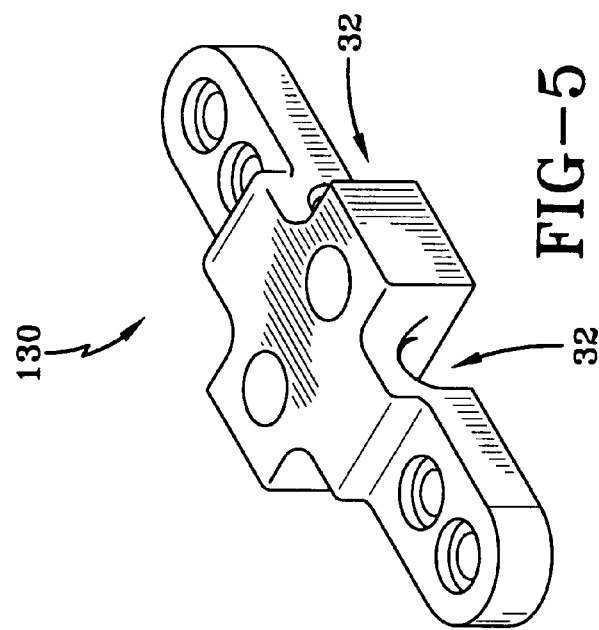
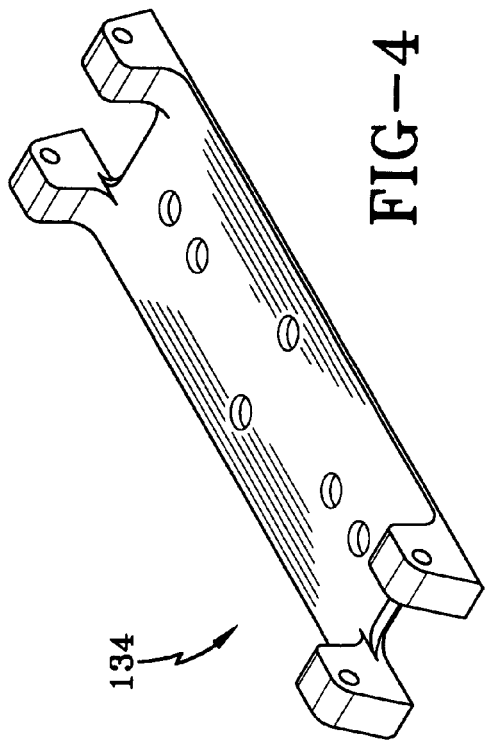
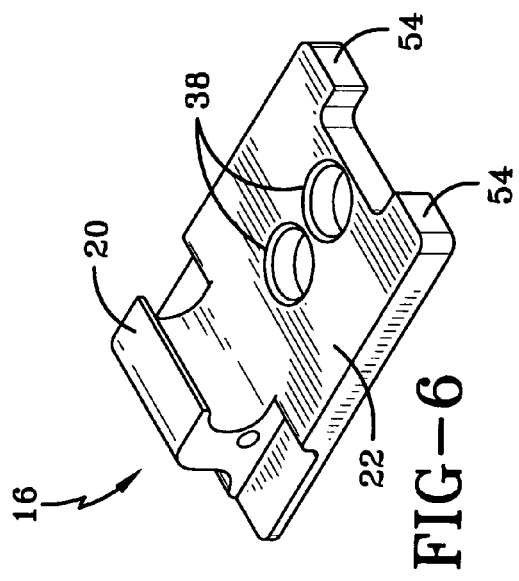

RETRACTABLE FITTING

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates, in general, to fittings, and, in particular, to retractable fittings.

BACKGROUND OF THE INVENTION

Known methods for securing pallets and containers for transportation may be time-consuming. Hardware such as straps, chains, stanchions, and lumber for blocking and bracing may be required. Fittings incorporated into decks, floors, walls, bulkheads, trailer beds, railroad cars, pick-up trucks, warehouse floors, cargo areas, and the like are known, but many of these fittings may not be retractable. Retractable fittings may be desirable because, when the fittings are retracted, the fittings may not obstruct the surrounding surface.

The Joint Modular Intermodal Container (JMIC) is known, for example, from U.S. patent application publication 20070215015, published on Sep. 20, 2007, which is hereby expressly incorporated by reference. JMICs may be equipped with interface fittings located at each top corner and receivers located at each bottom corner. When JMICs are stacked on one another, the fittings of the lower JMIC may fit into the receivers of the top JMIC. The JMICs may be locked to each other utilizing a locking feature. The locking capability may be used to lock JMICs to a deck that is equipped with JMIC type interface fittings. JMIC type deck fittings may enable JMICs to be secured in place on any deck surface, whether stationary or moveable. The deck fitting may be required to lock in a vertical position to ensure proper JMIC interface and locking. The deck fitting may allow JMICs to be secured in position easily without tools or hardware, thereby eliminating stanchions, straps, or chains commonly used for securing loads.

Fittings incorporated into decks, platforms, and floors may be required to be retractable or removable so that pallets and containers other than JMICs may be placed without interference. In addition, retractable fittings may allow unobstructed access for forklift and pallet trucks, and may remove potential tripping hazards to personnel. An additional benefit of retractable fittings may be for use as a general tie-down for pallets and containers, other than JMIC. Retractable deck fittings may greatly increase the efficiency of securing cargo, compared to current methods, and may eliminate the need for additional hardware. Retractable fittings may be desirable anywhere an anchor point may be needed, such as, for example, a pick-up truck bed, an industrial plant, a piece of machinery, recreational equipment, and countless other areas.

SUMMARY OF THE INVENTION

An aspect of the invention may be a retractable fitting assembly. The retractable fitting assembly may include a cover that is rotatable around a first axis between closed and open positions, and a fitting that is rotatable around a second axis between closed and open positions. The first and second axes may be spaced apart and generally parallel. A direction of rotation of the fitting from the closed position to the open position may be opposite a direction of rotation of the cover from the closed position to the open position. In the closed position of the cover and the open position of the fitting, at least a portion of the cover may abut the fitting.

An underside of the cover may include a cradle. In the closed position of the fitting and the closed position of the cover, a portion of the fitting may rest in the cradle. The fitting may include an eyelet type fitting.

The retractable fitting assembly may further include a first base for the cover. The first base may include a pin that may correspond to the first axis.

The retractable fitting assembly may further include a second base for the fitting, and a clamp fixed to the second base. The clamp and the second base may define an opening in which a portion of the fitting may be disposed. The portion of the fitting disposed in the opening may correspond to the second axis. A plate may include the first base and the second base. A cross-section of the fitting may be substantially circular.

The retractable fitting assembly may further include at least one fastener for fixing the clamp to the second base. An underside of the cover may include at least one recess. In the closed position of the cover, a portion of at least one fastener may be disposed in the recess in the underside of the cover.

The retractable fitting assembly may further include a second cover that is rotatable around a third axis between closed and open positions, and a second fitting that is rotatable around a fourth axis between closed and open positions. The third and fourth axes may be spaced apart from each other and may be generally parallel to the first and second axes. A direction of rotation of the second fitting from the closed position to the open position may be opposite a direction of rotation of the second cover from the closed position to the open position. In a closed position of the second cover and an open position of the second fitting, at least a portion of the second cover may abut the second fitting to thereby hinder rotation of the second fitting. The plate may include additional bases for the second cover and the second fitting.

The clamp and the plate may define a second opening in which a portion of the second fitting may be disposed. The portion of the second fitting disposed in the second opening may correspond to the fourth axis.

Another aspect of the invention may be a method that may include rotating a cover in a first direction around a first axis from a closed position to an open position, and rotating a fitting in a second direction that is opposite the first direction around a second axis from a closed position to an open position. The second axis may be spaced apart from and generally parallel to the first axis. The method may include rotating the cover from the open position to the closed position, and abutting at least a portion of the cover, in the closed position, against the fitting, in the open position, to thereby hinder rotation of the fitting.

The method may further include resting a portion of the fitting in a cradle on an underside of the cover when the fitting is in the closed position and the cover is in the closed position.

The invention will be better understood, and further objects, features, and advantages thereof will become more apparent from the following description of the exemplary embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 2A is a side view of the fitting of FIG. 2.

FIG. 4 is a perspective view of an exemplary plate for use with a retractable fitting assembly.

FIG. 5 is a perspective view of an exemplary clamp for use with a retractable fitting assembly.

FIG. 6 is a perspective view of the underside of an exemplary cover for use with a retractable fitting assembly.

DETAILED DESCRIPTION OF THE INVENTION

Figure 1:
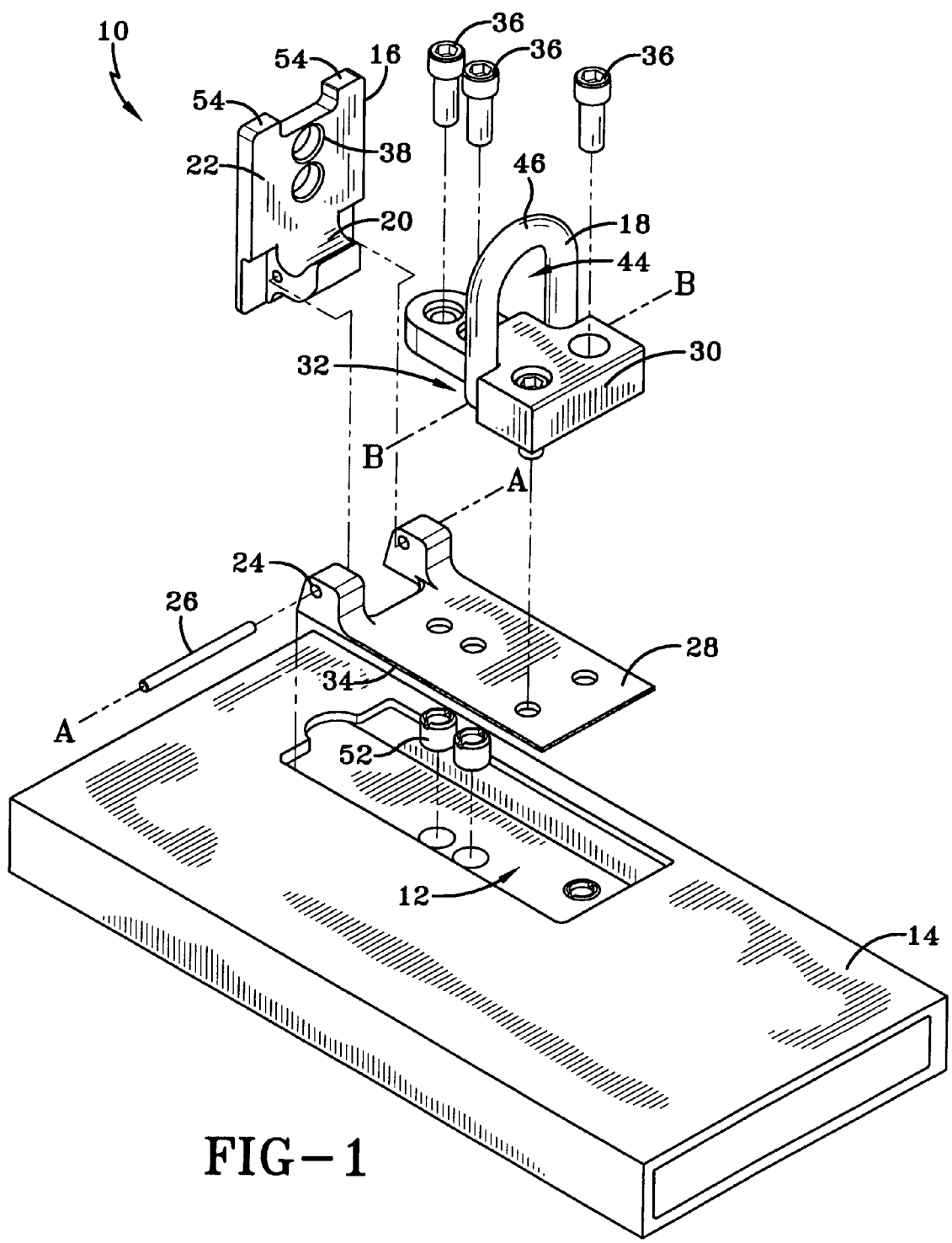
FIG. 1 is a perspective, exploded view of an embodiment of a retractable fitting assembly.

FIG. 1 is a perspective, exploded view of an embodiment of a retractable fitting assembly 10. The retractable fitting assembly 10 may be mounted in a recess or opening 12 in a surface 14. Surface 14 may be, for example, part of a deck or bulkhead of a ship or airplane; part of a bed of a truck or trailer; part of a bed of a railroad car; part of a floor or wall of a warehouse or storage area; a channel or track incorporated into a deck, bulkhead, railroad car, truck bed, trailer bed, floor, wall, or similar structure; or any surface where an anchor point or similar structure may be located. In FIG. 1, surface 14 is shown as generally horizontal. However, surface 14 may have any orientation such as vertical, angled, etc.

Assembly 10 may include a cover 16 that may be rotatable around an axis AA between closed and open positions. In FIG. 1, the cover 16 is in the open position and may be rotated in a clockwise direction to a closed position. A fitting 18 may be rotatable around an axis BB between closed and open positions. In FIG. 1, the fitting 18 is in the open position and may be rotated in a counterclockwise direction to a closed position. The axes AA and BB are spaced apart and generally parallel. The direction of rotation of the fitting 18 from the open position to the closed position is opposite the direction of rotation of the cover 16 from the open position to the closed position, and vice versa.

The fitting 18 may be, for example, an "eyelet" type fitting. That is, fitting 18 may include a through-hole or opening 44. The underside 22 of cover 16 may include a cradle 20. When the fitting 18 and cover 16 are both in closed position, a portion 46 of fitting 18 may rest in cradle 20. When cover 16 is rotated from the closed position to the open position, the cradle 20 moves portion 46, which causes the closed fitting 18 to rotate slightly upwardly, so that one may grasp fitting 18 to rotate fitting 18 to the fully open position.

Assembly 10 may include a base 24 for cover 16 and a pin 26 that may be held by base 24. Cover 16 may rotate around pin 26. Pin 26 may correspond to axis AA. Assembly 10 may include a base 28 for the fitting 18 and a clamp 30 fixed to the base 28. The clamp 30 and the base 28 may define an opening 32 (best seen in FIG. 5) in which a portion 48 (FIG. 2) of the fitting 18 may be disposed. The portion 48 of the fitting 18 disposed in the opening 32 may correspond to the axis BB. The cover base 24 and the fitting base 28 may be separate, individual components, or, as shown in FIG. 1, base 24 and base 28 may be formed in a single piece, such as a plate 34.

Figure 2:
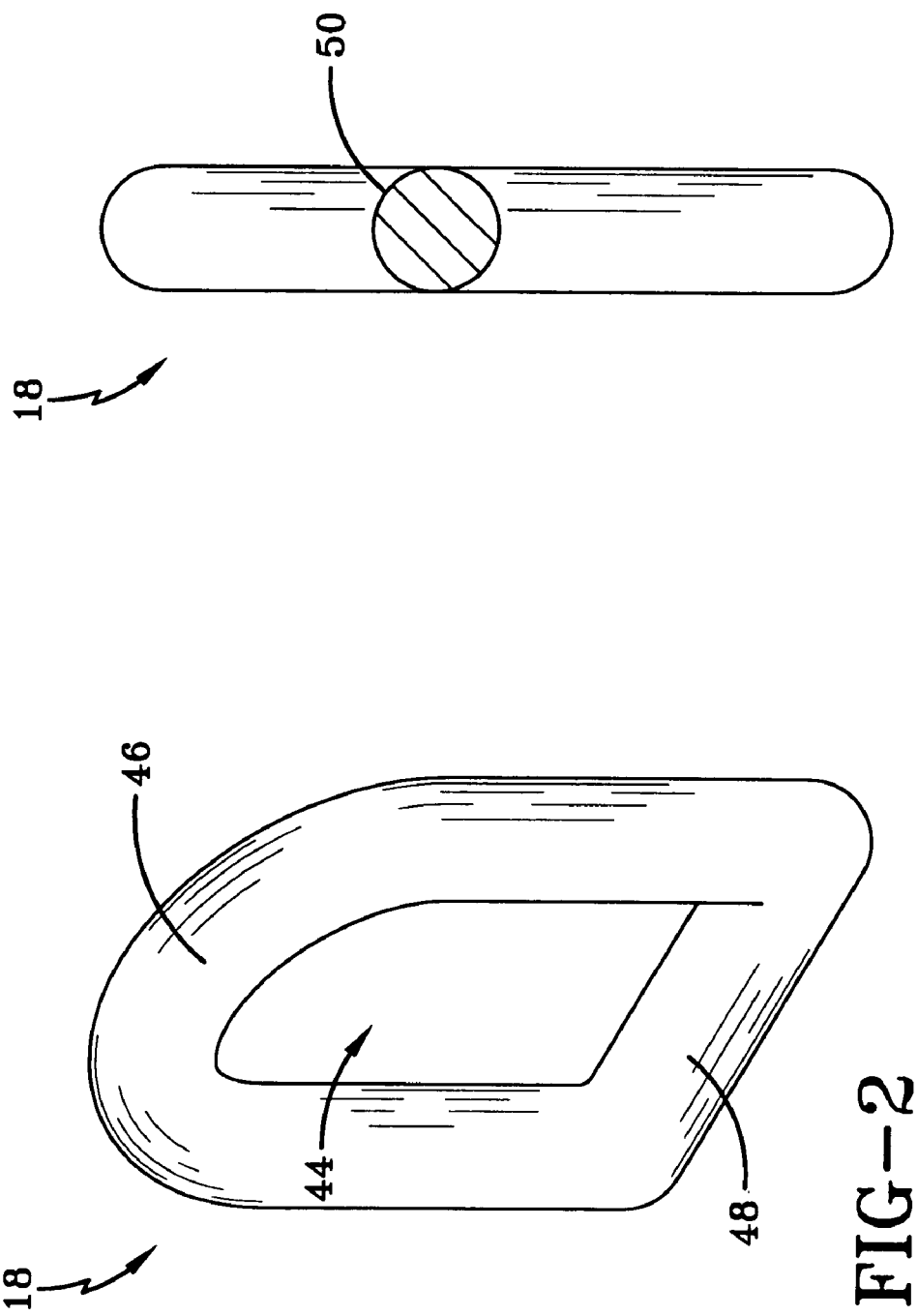
FIG. 2 is a perspective view of an exemplary fitting.

FIG. 2 is a perspective view of an exemplary fitting 18 showing the through-hole or opening 44, the portion 46 that may rest in cradle 20, and the portion 48 that may be disposed in the opening 32 defined by the clamp 30 and the base 28. FIG. 2A is a side view of fitting 18 showing, for example, a substantially circular cross-section 50 of the fitting 18. However, fittings with other than circular cross-sections may be used. Fitting 18 may be used, for example, as a general tie-down, or to receive a locking rod or hook associated with, for example, pallets or containers, such as the JMIC.

Referring again to FIG. 1, assembly 10 may include at least one fastener 36 for fixing the clamp 30 to the base 28. Fasteners 36 may also fix base 28 in opening 12. If needed, thread inserts 52 may be used to engage fasteners 36.

An underside 22 of the cover 16 may include at least one recess 38. In the closed position of the cover 16, a portion (the head) of at least one fastener 36 may be disposed in a recess 38 in the underside 22 of the cover 16. When the fitting 18 is in the open position, as in FIG. 1, the cover 16 may be rotated to a closed position so that the heads of fasteners 36 rest in recesses 38 and provide additional strength to cover 22. When the fitting 18 is open, as in FIG. 1, and the cover 22 is rotated to the closed position, at least a portion 54 of the cover 16 may abut the fitting 18 to thereby hinder rotation of the fitting 18 out of the open position.

Figure 3:
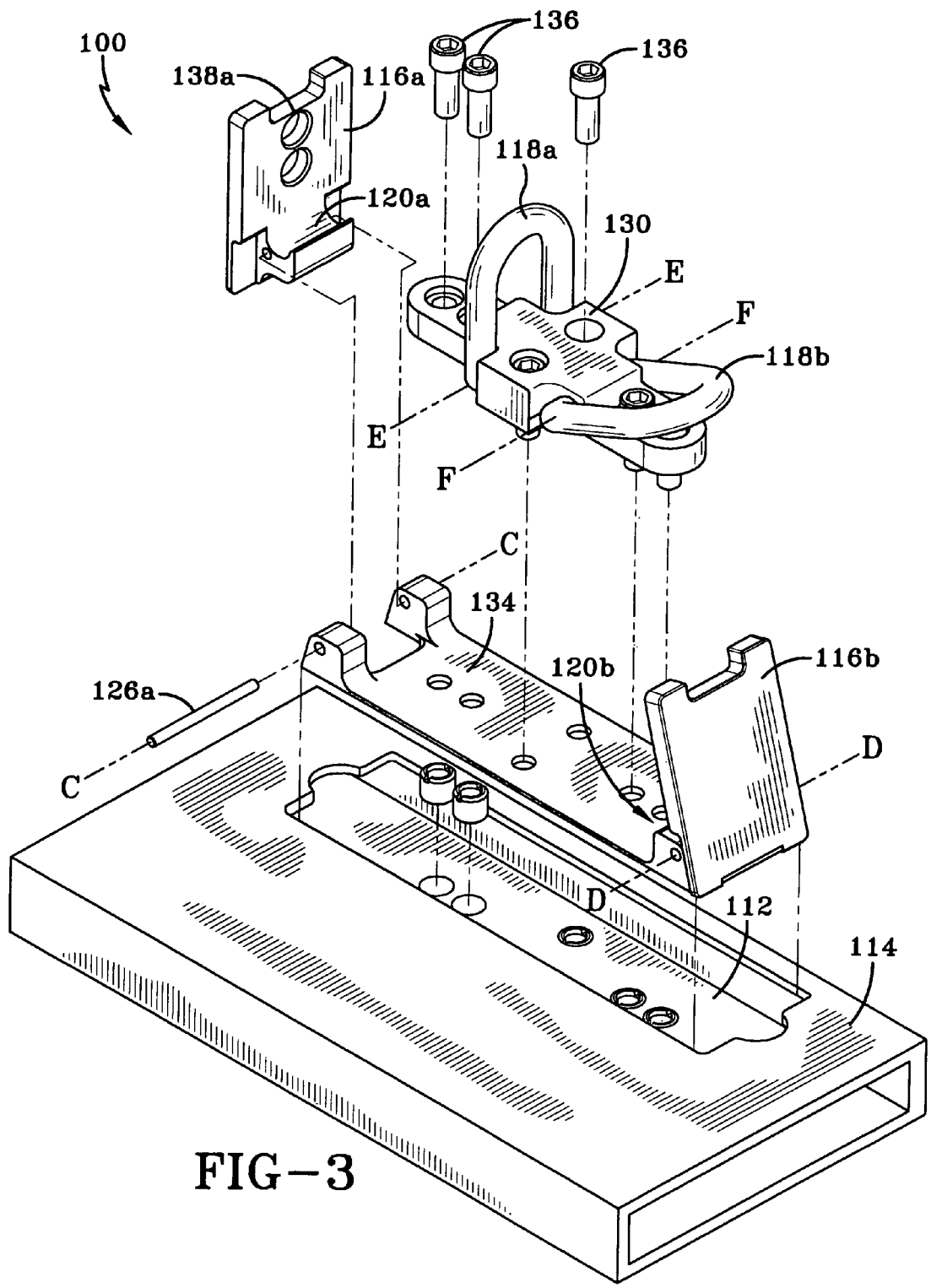
FIG. 3 is a perspective, exploded view of another embodiment of a retractable fitting assembly.

FIG. 3 is a perspective, exploded view of another embodiment of a retractable fitting assembly 100. The retractable fitting assembly 100 may be mounted in a recess or opening 112 in a surface 114. Surface 114 may be, for example, part of a deck or bulkhead of a ship or airplane; part of a bed of a truck or trailer; part of a bed of a railroad car; part of a floor or wall of a warehouse or storage area; a channel or track incorporated into a deck, bulkhead, railroad car, truck bed, trailer bed, floor, wall, or similar structure; or any surface where an anchor point or similar structure may be located. In FIG. 3, surface 114 is shown as generally horizontal. However, surface 114 may have any orientation such as vertical, angled, etc.

Assembly 100 may include covers 116a and 116b that may be rotatable around axes CC and DD, respectively, between closed and open positions. In FIG. 3, the covers 116a and 116b are in the open position. Fittings 118a and 118b may be rotatable around axes EE and FF, respectively, between closed and open positions. In FIG. 3, the fitting 118a is in the open position and fitting 118b is in a position between the open position and the closed position. The axes CC and EE are spaced apart and generally parallel, as are the axes DD and FF. The axes CC, DD, EE, and FF may be generally parallel to each other. The bases for the covers 116a and 116b and the fittings 118a and 118b (corresponding to the cover base 24 and fitting base 28 of FIG. 1) may be formed of a single plate 134, or may be individual, separate pieces.

The fittings 118 may be similar to fitting 18 shown in FIGS. 2 and 2A. The undersides of covers 116a and 116b may include cradles 120a and 120b. Cradle 120b is not visible in FIG. 3. Covers 116a and 116b may rotate around pins 126a and 126b. Pins 126a and 126b may correspond to axes CC and DD, respectively. A clamp 130 may be fixed to the plate 134.

FIG. 4 is a perspective view of an exemplary plate 134. FIG. 5 is a perspective view of an exemplary clamp 130. The clamp 130 and the plate 134 may define openings 32 (FIG. 5) in which a portion (corresponding to portion 48 of fitting 18 in FIG. 2) of the fittings 118a and 118b may be disposed. The portions of the fittings 118a and 118b disposed in the openings 32 may correspond to the axes EE and FF, respectively. The heads of fasteners 136 may be disposed in recesses 138a when cover 116a is closed. The interactions between cover 116a and fitting 118a, and cover 116b and fitting 118b, are akin to the interactions between cover 16 and fitting 18, described above.

FIG. 6 is a perspective view of the underside 22 of an exemplary cover 16 (FIG. 1) showing the cradle 20, the recesses 38 for the heads of fasteners 36, and the portions 54 that may abut against the fitting 18 when the fitting 18 is in the open position and the cover 16 is in the closed position. Covers 116a and 116b may be constructed like cover 16.

Figure 7:
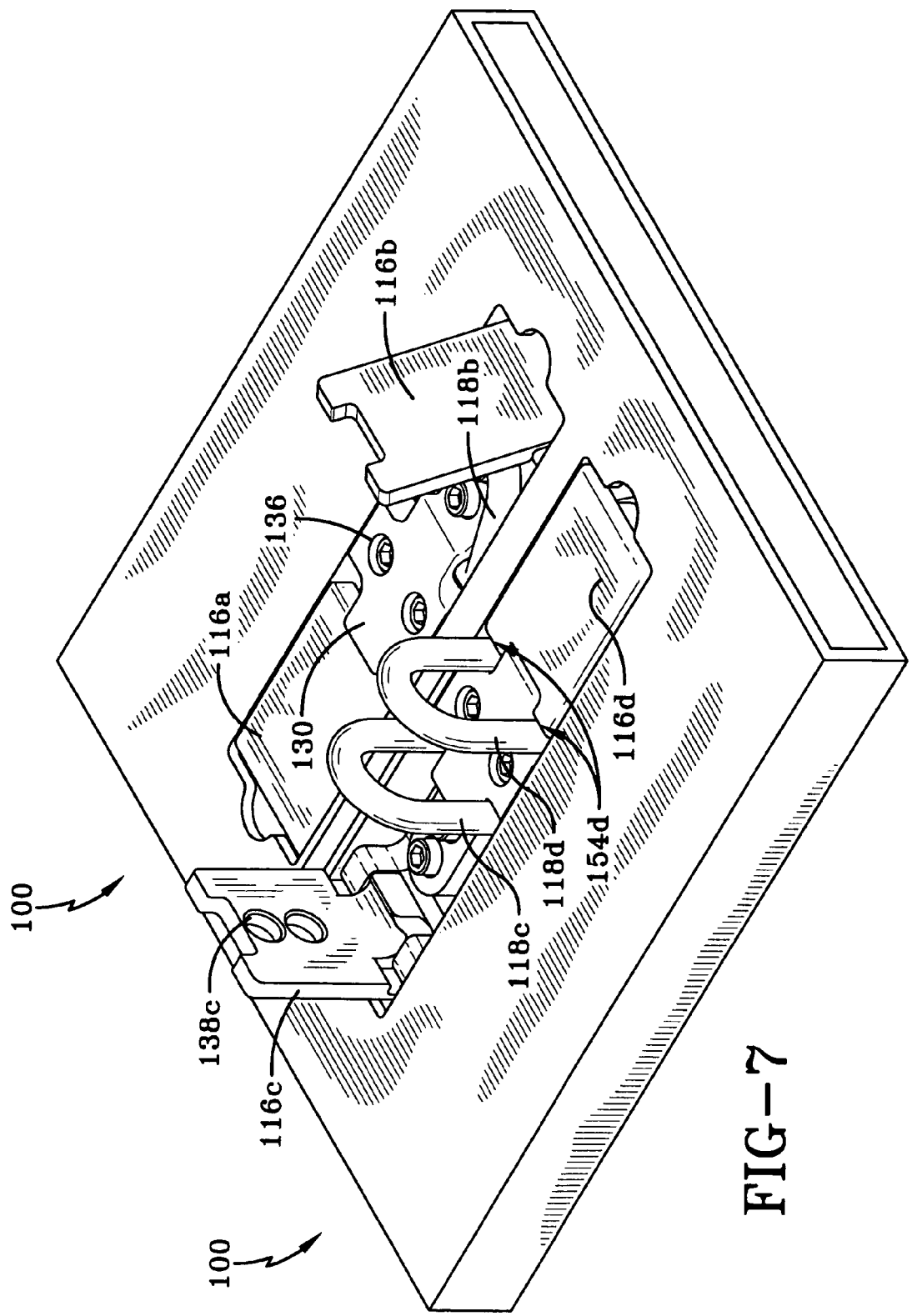
FIG. 7 is a perspective view of two of the retractable fitting assemblies of FIG. 3, showing various positions of the covers and fittings.

FIG. 7 is a perspective view of two of the retractable fitting assemblies 100 of FIG. 3, showing various positions of the covers and fittings. Cover 116a is in the closed position with fitting 118a (not visible) in the closed position beneath cover 116a. Cover 116b is between the fully closed and fully open position with fitting 118b having been slightly raised by the movement of the cover 116b. Cover 116c is in the fully open position and fitting 118c is in the fully open position. Cover 116d is in the closed position and fitting 118d is in the open position. Portions 154d of cover 116d abut fitting 118d to prevent fitting 118d from rotating back to its closed position, or otherwise moving.

Any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A retractable fitting assembly, comprising:
    a cover being rotatable around a first axis between closed and open positions;
    a fitting being rotatable around a second axis between closed and open positions,
        wherein the first and second axes are spaced apart and generally parallel; and
    a first direction of rotation of the fitting from the closed position to the open position being opposite a second direction of rotation of the cover from the closed position to the open position,
        wherein, in the closed position of the cover and the open position of the fitting, at least a portion of the cover abuts the fitting to thereby hinder rotation of the fitting.

2. The assembly of claim 1, wherein an underside of the cover includes a cradle.

3. The assembly of claim 2, wherein, in the closed position of the fitting and the closed position of the cover, a portion of the fitting rests in the cradle.

4. The assembly of claim 1, wherein the fitting comprises an eyelet type fitting.

5. The assembly of claim 1, further comprising a first base for the cover, the first base includes a pin corresponding to the first axis.

6. The assembly of claim 5, further comprising a second base for the fitting; and
    a clamp being fixed to the second base,
        wherein the clamp and the second base define an opening in which a portion of the fitting is disposed, and
        wherein the portion of the fitting disposed in the opening corresponds to the second axis.

7. The assembly of claim 5, further comprising a second base for the fitting;
    a clamp being fixed to the second base; and
    a plate comprising the first base and the second base.

8. The assembly of claim 1, wherein a cross-section of the fitting is substantially circular.

9. The assembly of claim 5, further comprising a second base for the fitting;
    a clamp being fixed to the second base;
    at least one fastener for fixing the clamp to the second base; and
    an underside of the cover including at least one recess,
        wherein, in the closed position of the cover, a portion of said at least one fastener is disposed in said at leas one recess in the underside of the cover.

10. The assembly of claim 5, further comprising a second base for the fitting;
    a clamp being fixed to the second base;
    a plate comprising the first base and the second base;
    a second cover being rotatable around a third axis between closed and open positions;
    a second fitting being rotatable around a fourth axis between closed and open positions,
        wherein the third and fourth axes are spaced apart from each other and generally parallel to the first axis and the second axis; and
    a third direction of rotation of the second fitting from the closed position to the open position being opposite a fourth direction of rotation of the second cover from the closed position to the open position,
        wherein, in the closed position of the second cover and the open position of the second fitting, at least a portion of the second cover abuts the second fitting to thereby hinder rotation of the second fitting.

11. The assembly of claim 5, further comprising a second base for the fitting;
    a clamp being fixed to the second base; a plate comprising the first base and the second base;
    a second cover being rotatable around a third axis between closed and open positions; and
    a second fitting being rotatable around a fourth axis between closed and open positions,
        wherein the plate comprises additional bases for the second cover and the second fitting.

12. The assembly of claim 5, further comprising a second base for the fitting;
    a clamp being fixed to the second base;
    a plate comprising the first base and the second base;
    a second cover being rotatable around a third axis between closed and open positions; and
    a second fitting being rotatable around a fourth axis between closed and open positions,
        wherein the clamp and the plate define a second opening in which a portion of the second fitting is disposed, and
        wherein the portion of the second fitting disposed in the second opening corresponds to the fourth axis.

13. A method, comprising:
    rotating a cover in a first direction around a first axis from a closed position to an open position;
    rotating a fitting in a second direction being opposite the first direction around a second axis from a closed position to an open position, wherein the second axis is spaced apart from and generally parallel to the first axis;
rotating the cover from the open position to the closed position; and
abutting at least a portion of the cover, in the closed position, against the fitting, in the open position, to thereby hinder rotation of the fitting.

14. The method of claim 13, further comprising resting a portion of the fitting in a cradle on an underside of the cover when the fitting is in the closed position and the cover is in the closed position.

* * * * *